United States Patent [19]
Khattab

[11] Patent Number: 6,138,579
[45] Date of Patent: Oct. 31, 2000

[54] AUTORACK RAILCAR ADJUSTABLE DECKING STRUCTURE AND METHOD

[75] Inventor: Mohamed A. Khattab, Burlington, Canada

[73] Assignee: National Steel Car Limited, Ontario, Canada

[21] Appl. No.: 09/063,107

[22] Filed: Apr. 21, 1998

[51] Int. Cl.[7] .................................................. B61D 3/00
[52] U.S. Cl. .......................... 105/370; 105/355; 410/26
[58] Field of Search ................................ 105/329.1, 355, 105/358, 360, 370, 371, 375, 396, 397, 399, 401, 404, 407, 409, 411, 416, 418, 422; 410/3, 4, 24, 26, 29, 28, 28.1, 29.1; 414/475

[56] References Cited

U.S. PATENT DOCUMENTS

| | | |
|---|---|---|
| 1,083,831 | 1/1914 | Holdaway et al. . |
| 1,229,374 | 6/1917 | Youngblood . |
| 1,514,211 | 11/1924 | Hester . |
| 1,841,066 | 1/1932 | Simning . |
| 1,894,534 | 1/1933 | Dolan . |
| 2,009,149 | 7/1935 | Pierce . |
| 2,565,709 | 8/1951 | Watter . |
| 2,659,318 | 11/1953 | Steins et al. . |
| 2,801,597 | 8/1957 | Ecoff . |
| 2,929,339 | 3/1960 | Schueder et al. ........................ 105/368 |
| 2,959,262 | 11/1960 | Parker et al. ................................ 192/4 |
| 3,017,840 | 1/1962 | Fairweather . |
| 3,102,497 | 9/1963 | Candlin et al. . |
| 3,173,382 | 3/1965 | Ryan . |
| 3,205,836 | 9/1965 | Wojcikowski ........................... 105/368 |
| 3,221,669 | 12/1965 | Baker et al. ............................. 105/368 |
| 3,230,900 | 1/1966 | Ruprecht et al. . |
| 3,240,167 | 3/1966 | Podesta et al. .......................... 105/368 |
| 3,370,552 | 2/1968 | Podesta et al. .......................... 105/368 |
| 3,405,661 | 10/1968 | Erickson et al. ......................... 105/371 |
| 3,426,704 | 2/1969 | Blunden . |
| 3,516,706 | 6/1970 | Bruce ....................................... 296/24 |
| 3,547,049 | 12/1970 | Sanders .................................... 105/368 |
| 3,927,621 | 12/1975 | Skeltis et al. . |
| 4,119,042 | 10/1978 | Naves et al. . |
| 4,119,043 | 10/1978 | Naves et al. . |
| 4,149,472 | 4/1979 | Naves et al. . |
| 4,701,086 | 10/1987 | Thorndyke ................................. 410/26 |
| 4,759,669 | 7/1988 | Robertson et al. ........................ 410/29 |
| 4,786,222 | 11/1988 | Blodgett .................................... 410/29 |
| 4,881,859 | 11/1989 | Ehrlich ................................... 410/29.1 |
| 4,992,013 | 2/1991 | Westerdale ............................. 410/29.1 |
| 5,042,395 | 8/1991 | Wackerle et al. . |
| 5,106,246 | 4/1992 | Chance ...................................... 410/26 |
| 5,218,794 | 6/1993 | Ehrlich ........................................ 52/64 |
| 5,286,149 | 2/1994 | Seay et al. ................................. 410/26 |
| 5,320,046 | 6/1994 | Hesch . |
| 5,362,345 | 11/1994 | Stetler et al. . |
| 5,383,406 | 1/1995 | Vanolo et al. . |
| 5,392,717 | 2/1995 | Hesch et al. ............................. 105/404 |
| 5,511,491 | 4/1996 | Hesch et al. ............................. 104/404 |
| 5,601,034 | 2/1997 | Tao et al. . |
| 5,685,228 | 11/1997 | Ehrich et al. ............................ 105/370 |
| 5,685,229 | 11/1997 | O'Hara et al. . |
| 5,743,192 | 4/1998 | Saxton et al. ............................ 105/355 |
| 5,762,798 | 5/1998 | Smidler .................................... 414/475 |
| 5,832,836 | 11/1998 | Ehrlich et al. . |
| 5,857,414 | 1/1999 | Thoman et al. . |

FOREIGN PATENT DOCUMENTS

| | | |
|---|---|---|
| 2191673 | 5/1997 | Canada . |
| 1095600 | 6/1955 | France . |
| 4-143161 | of 1992 | Japan . |

OTHER PUBLICATIONS

Road & Rail—Wabash National Corporation Newsletter Issue 7, Summer 1996.

*Primary Examiner*—Mark T. Le
*Attorney, Agent, or Firm*—Oldham & Oldham Co., L.P.A.

[57] ABSTRACT

A railcar has a substructure, a superstructure and side webwork joining the substructure and the superstructure, leaving an interior space suitable for carrying automobiles. The number of automobiles carried within the railcar structure, and the versatility of the railcar, are improved by using an adjustable decking structure which allows vehicles of different sizes to be carried. The decking is moveable to permit a lower, or main deck to be loaded before loading other decks. The decking structure is also movable between a two deck and a three deck configuration. Middle and upper decks may be adjusted and loaded in a suitable manner. Provision is made for the adjustable decks to be driven positively both upward and downward.

12 Claims, 14 Drawing Sheets

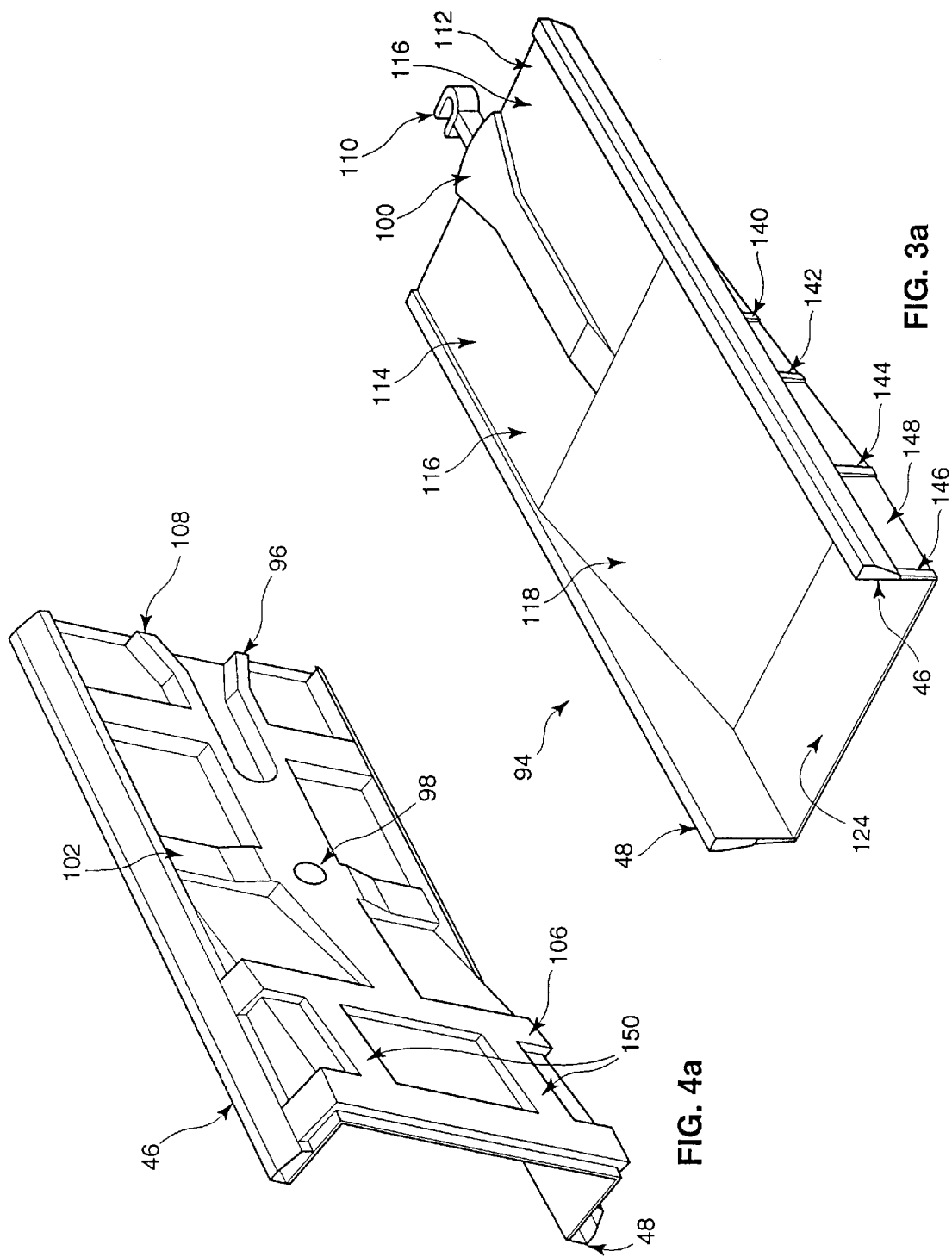

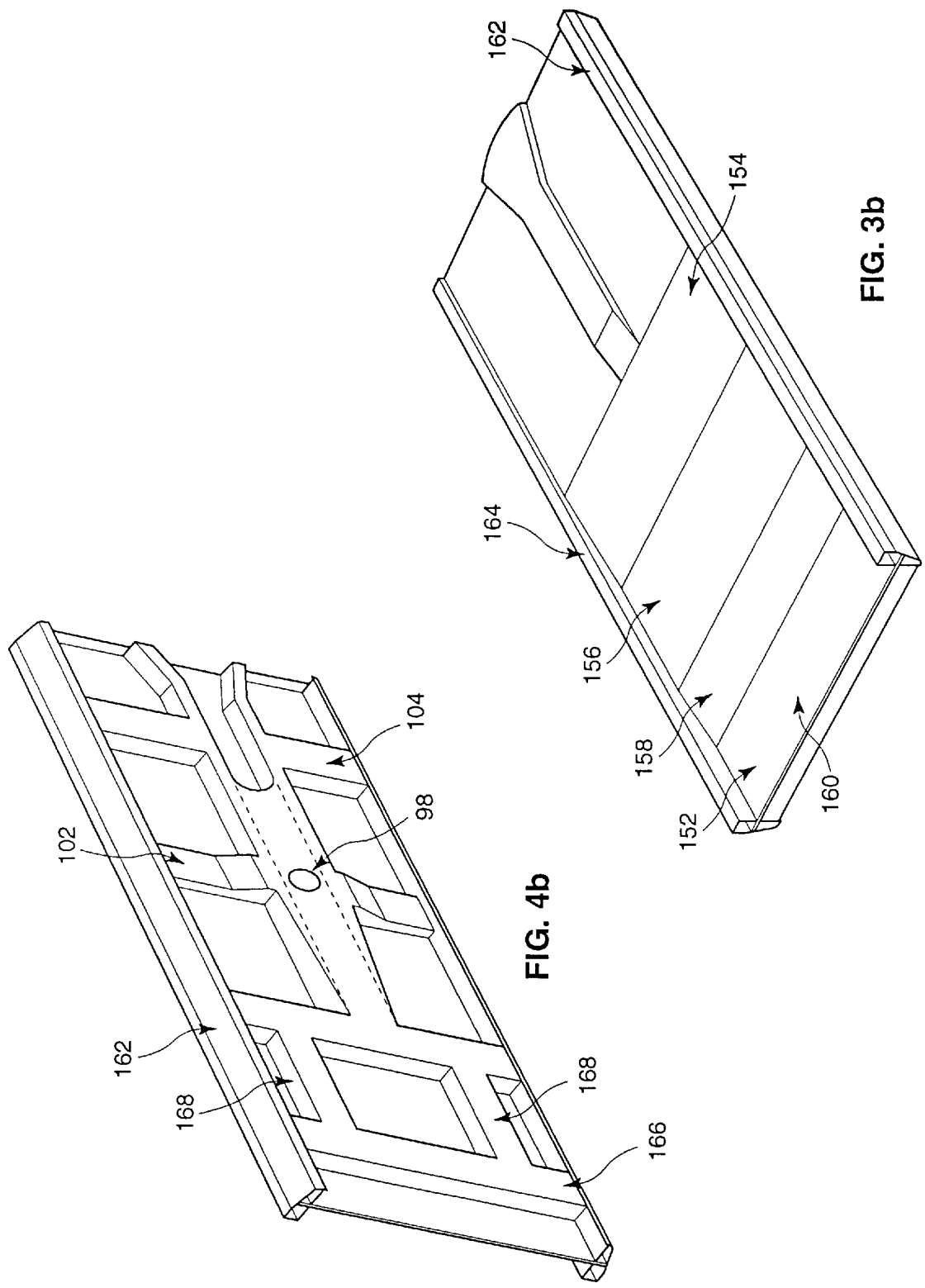

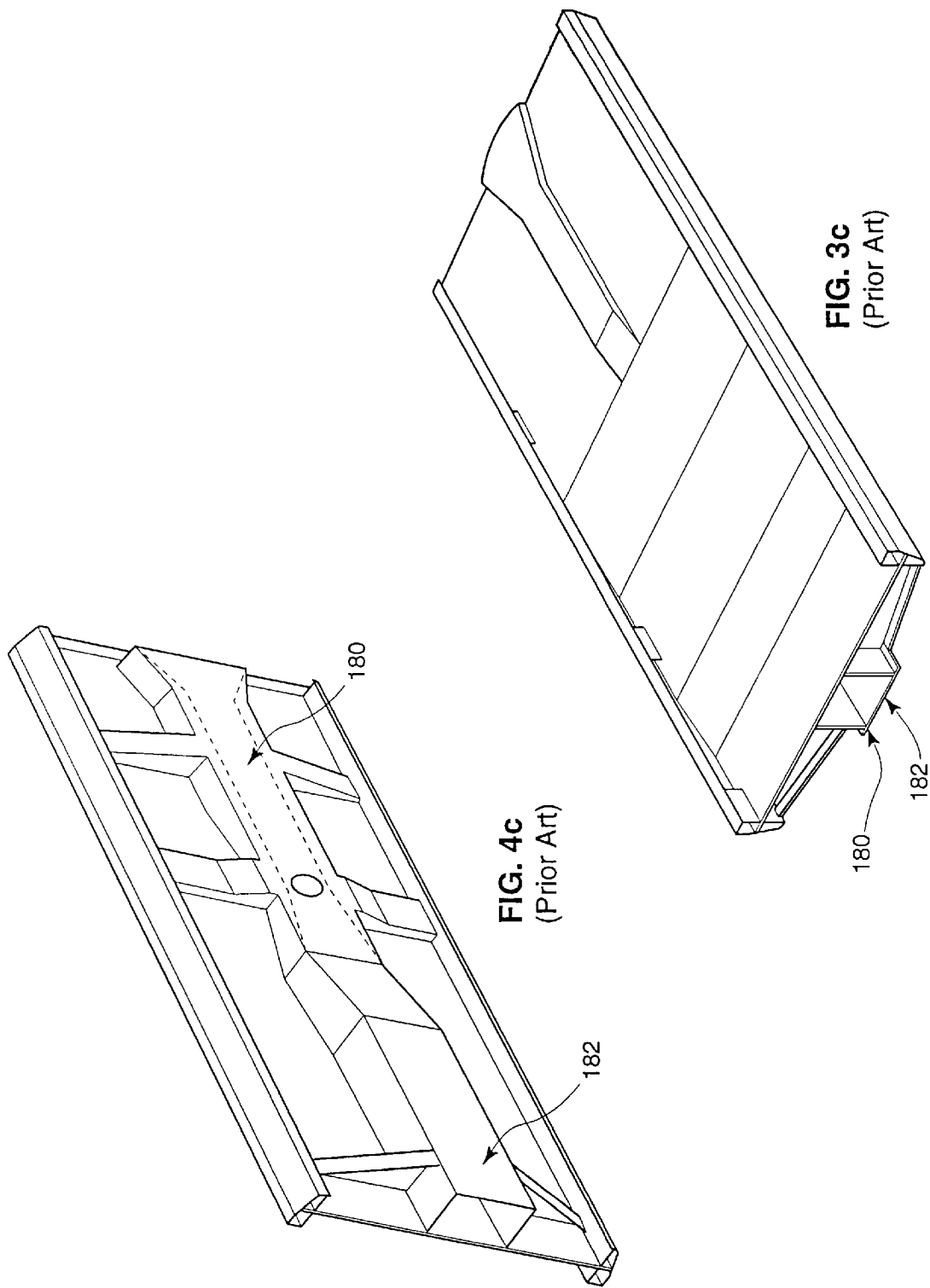

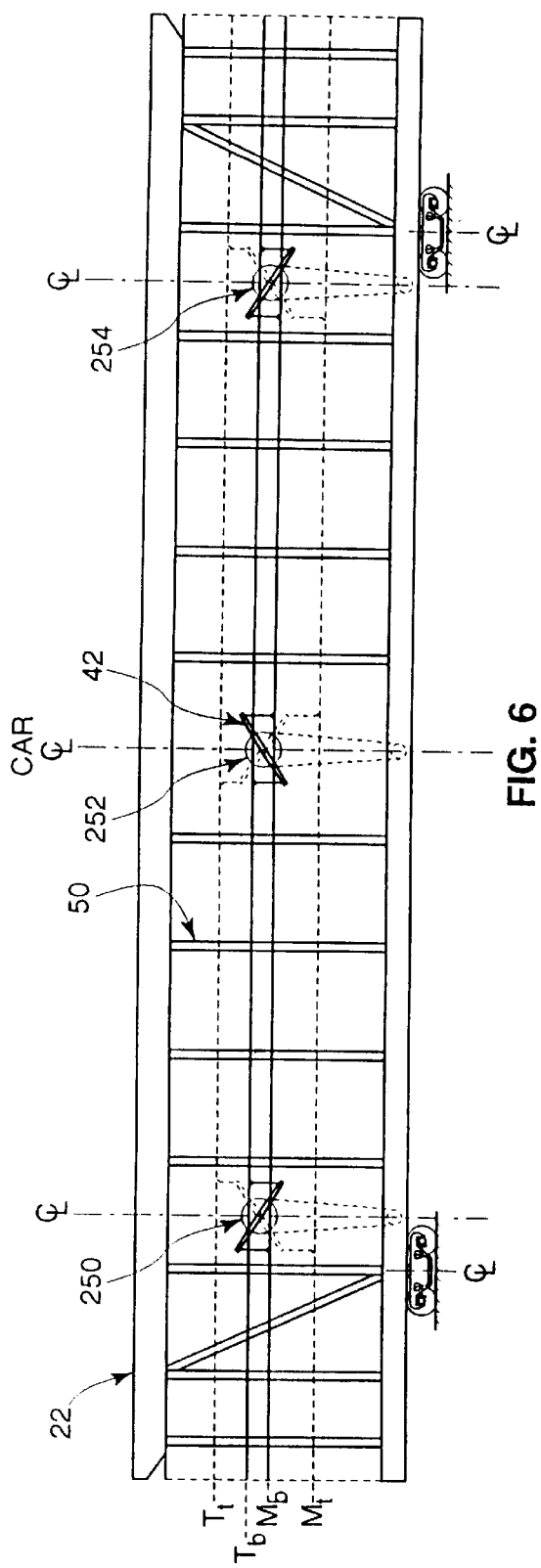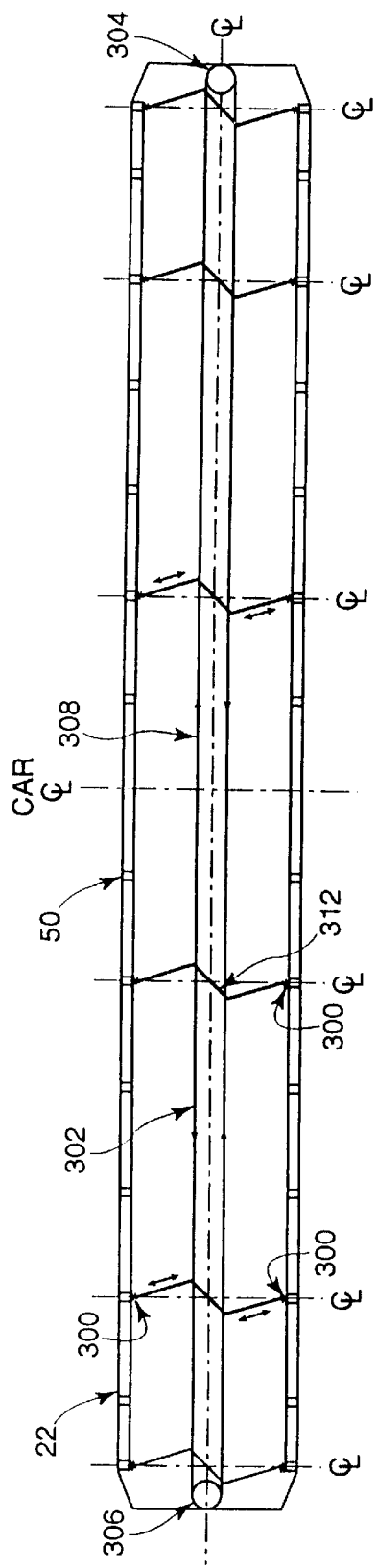

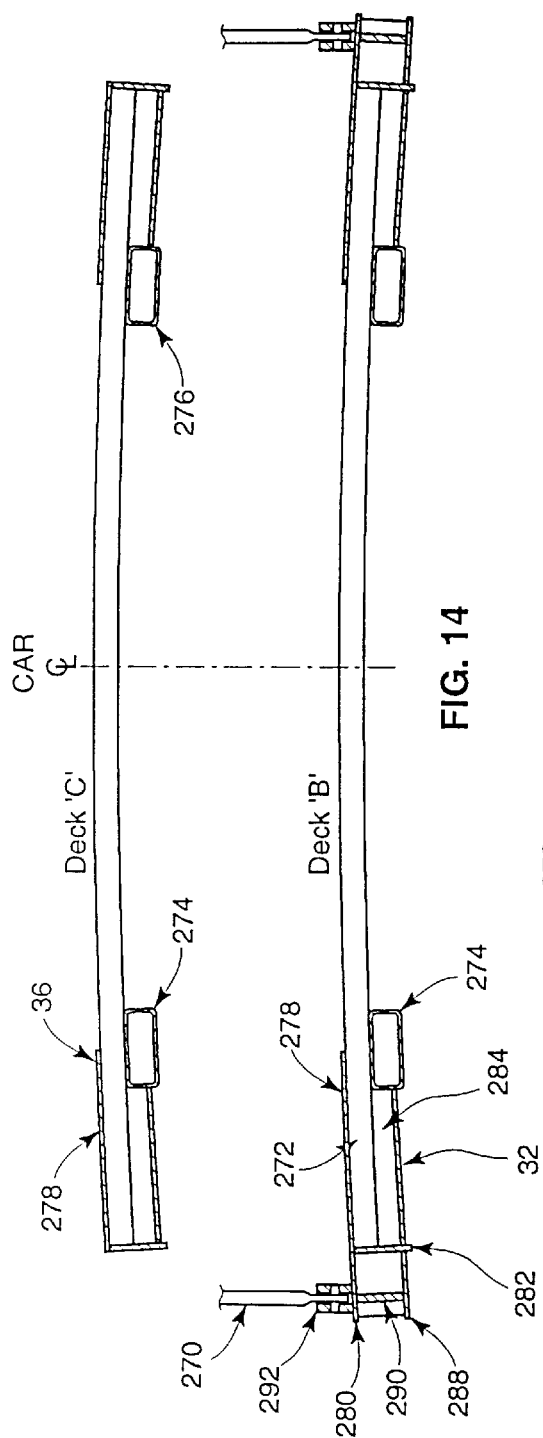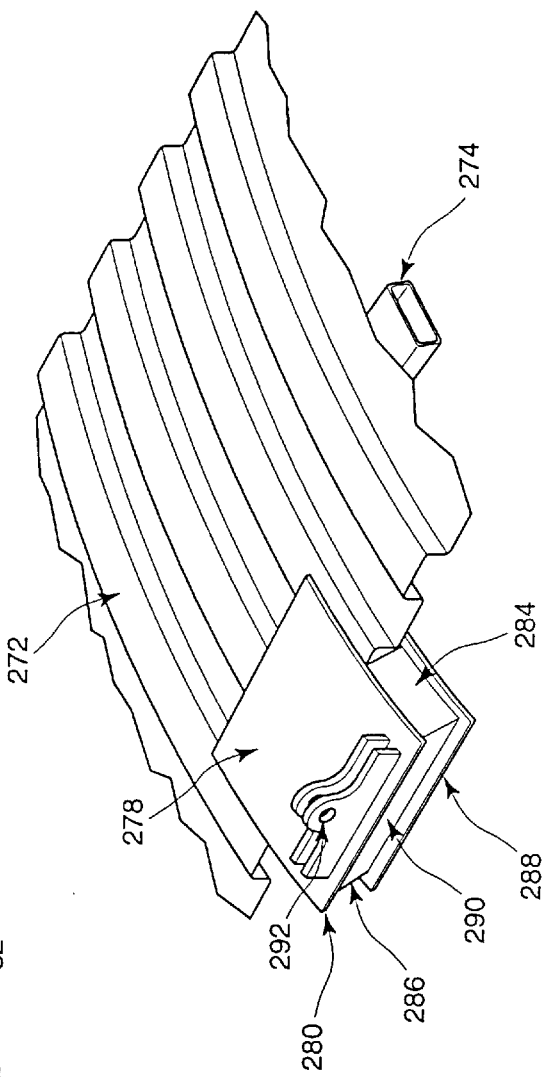

AUTORACK RAILCAR ADJUSTABLE DECKING STRUCTURE AND METHOD

FIELD OF THE INVENTION

This invention relates to structures for railcars such as may be applicable, for example, to railcars for carrying automobiles, trucks or other vehicles in a multiple deck arrangement.

BACKGROUND OF THE INVENTION

As a general principle of railcar design and operation it is advantageous to maximize the ratio of gross (fully loaded) car weight to light (empty) car weight, so that effort expended to drive a train is used to move freight, rather than merely to move the weight of the railcars. This can be done in three ways. First, the weight of the load can be increased, up to a regulated limit. Second, the weight of the railcar can be reduced. Third, the versatility of the railcar can be improved so that it spends less time rolling empty or partially empty. In applying this principle to automobile carrying railcars, improvements in the versatility of stacking more than one layer of automobiles per car and in reducing railcar weight tend to improve energy efficiency per unit of weight carried.

Railcars have long been used to carry automobiles. An early method was to carry automobiles or trucks on standard flat cars. In the flatcar type of design, the automobiles were loaded on a flat deck, and the main fore-and-aft structural member of the railcar was a centre sill. Automobiles are a relatively low density load, unlikely to reach the railcar lading limits. Consequently, from at least as early as U.S. Pat. No. 1,229,374 issued Jun. 12, 1917 to Youngblood, attempts have been made to stack vehicles, and thereby increase the load carried by each railcar.

One way to allow higher stacking was to use a centre-depressed railcar as shown in U.S. Pat. No. 1,894,534 issued Oct. 9, 1931 to Dolan, in which the main fore-and-aft structural members, a pair of side sills, drop down between the railcar trucks. Dolan employed individual stacking units for each automobile lifted. Youngblood used a full length lifting deck which permitted two loading configurations—a lowered position, and a raised position.

Youngblood shows a lifting structure installed on an existing car and surrounded by box car sides. Later designs show a flatcar deck and spaced apart vertical stanchions from which the automobile decks are suspended. This kind of flat-car with stanchion structure is shown, for example, in U.S. Pat. No. 3,119,350 issued Jan. 28, 1964 to Bellingher; U.S. Pat. No. 3,205,836 issued Sept. 14, 1965 to Wojcikowski; U.S. Pat. No. 3,221,669 issued Dec. 7, 1965 to Baker et al., U.S. Pat. No. 3,240,167 issued Mar. 15, 1966 to Podesta et al.; and U.S. Pat. No. 3,547,049 issued Dec. 15, 1970 to Sanders. The full length, flat deck tri-level style of auto carrier became, and remains, the industry standard.

Triple deck cars are typically designed to carry about a dozen automobiles over railcar truck centres of 55 to 60 feet and unit length of about 70 feet, or fifteen to eighteen cars on railcar truck centres of 64 to 70 foot centres on a railcar having a total main deck length of about 90 feet. For an average automobile weight of about 2000 Lbs., this gives a load in the range of 24,000 Lbs/70 feet (roughly 350 Lbs/ft) to 36,000 Lbs/90 feet (roughly 400 Lbs/ft). Yet a standard flatcar is designed to carry 100,000 Lbs (roughly 1000–1300 Lbs/feet). Thus the basic flat car structure has much greater capacity than is required for the load.

In one currently used design, the flatcar weighs roughly 60,000 Lbs, and the automobile supporting superstructure weighs more than 32,000 Lbs, for a total of 92,000 Lbs. For an automobile load of 30,000 Lbs., roughly three quarters of the hauling effort is expended to move the railcars. And, on the return journey the cars may be empty.

In a traditional railcar the bending moment due to the vertical load is carried in a fully extending longitudinal centre sill. In one example sill dimensions were roughly as follows: (a) Overall Height—30" (b) Top Flange Effective Width—40" (+/−) (c) Top Flange Thickness—0.375" (d) Bottom Flange Width—30" (e) Bottom Flange Thickness—0.625" (f) Web Thickness—0.375" The centre sill, by itself, had an effective cross sectional area of about 59 in sq. Typical side sills for such a car each had a depth of about 14", a cross-sectional area of 8.5 in. sq., giving an overall area of about 76 in.sq. Put in other terms, a cross sectional area of 76 in sq. is roughly equivalent to a sectional weight of slightly over 250 Lbs. per lineal foot. A cross sectional area of 30 inches similarly corresponds to just over 100 Lbs. per lineal foot. The second moment of area of the centre sill was about 9600 in$^4$, the local second moment of area of each of the side sills was about 240 in$^4$. For a car having a main deck at 38 inches above top of rail (TOR) the effective neutral axis of the structure was about 24 inches above TOR and the effective second moment of area was about 11,900 in$^4$. The flat car was designed for a 200,000 Lb maximum load, rather than a 30 to 40,000 Lb load.

One way to reduce the weight of the rail-car is to minimize, or to do away with, the main sill. To that end, an automobile carrier having an integrated load bearing roof structure permits a reduction in the size and weight of the main sills. The bending moment due to the load and due to the railcar's own weight can be carried in a truss having an effective depth roughly equal to the height of the railcar itself. For a flat decked car, removal of all but the end portions of the centre sill presents an opportunity to save several thousands of pounds of weight. Consequential weight savings—from the removal of ancillary cross beams and the use of correspondingly lighter upper structure, may permit additional weight savings.

Automobile carriers, having had a long historical descent from flat cars, have not had substantial roof structures. Coverings, if used at all, have tended to be supported on the tops of the vertical stanchions, and have tended to involve only secondary or tertiary structural support. The primary structural members have remained the longitudinal main sills at the main deck level, whether along the centre of the car, or as large side sills on centre-depressed cars or well cars.

A railcar can be idealized as a beam simply supported at, or near, its ends by a pair of railcar trucks. The span of the beam is typically 60 to 75 feet. It must withstand longitudinal loads in tension and compression, and longitudinally distributed loads acting vertically causing the beam to bend. Design is limited by the yield stress of the material at the point of maximum bending moment. For a known maximum load distribution, the maximum stress in the material is reduced when the second moment of area of the structure is large and when a relatively larger share of the material of the section is concentrated far from the neutral axis of the section. Use of a deep section with well spaced flanges is likely to permit a smaller quantity of material to be used to carry the same load. Thus, not only does the removal of the centre sill promise a reduction in weight, but, by using a truss and so deepening the beam, there is an opportunity to reduce the thickness of the remaining material.

Another way to reduce the weight of an automobile carrier is to reduce the number of trucks. To that end, an articulated car of several units, whether 3 or 5, or some other number, would save considerable weight over the older style cars. Articulation is suitable too, given the convenience of being able to drive from one rail-car to the next when loading automobiles.

It remains to consider the versatility of existing automobile carrier designs. Wojcikowski used three decks running the entire length of the car, those decks being movable to the desired heights for carrying cars. U.S. Pat. No. 3,221,669 issued Dec. 7, 1965 shows another kind of adjustable tri-level full-length deck car. Another tri-level car, with fixed height decks is shown in U.S. Pat. No. 3,240,167 issued Feb. 27, 1961 to Podesta et al., has gangplanks to permit automobiles to be driven from one railcar to the next in a multi-car train, thus simplifying loading.

It is advantageous to be able to carry different heights of vehicles on one train, or to be able to convert from a three level train, for carrying sedans, to a two level train, for carrying utility vehicles, for example, since this may allow an operator to reduce the amount of empty, or less than full, operation.

According to the American Association of Railroads standards, the lower deck of a bi-level car should be located 3'–8½" above the top of the rail for a new railcar. The upper deck should have a minimum clearance of 7'3" above the lower deck, and a maximum height of 11'14 3" above the rail. The roof structure should have a minimum clearance of 7'9¼" above the upper deck, and the overall railcar height at the railcar centre line should not exceed 19'–1 ".

Similarly, the deck heights for a tri-level car require that (a) the lowest deck be 2'7½" above rail; (b) the middle deck be 8'–0¹¹⁄₁₆" above rail, with a minimum clearance of 5'2⅜" above the lowest deck; (c) the top deck be 13'–4⅜" above rail, with a minimum clearance of 5'–1⅞" above the middle deck, and (d) the maximum railcar height at centre line is 19'–1' with at least 5'–5¹¹⁄₁₆" clearance above the top deck.

It can be seen from these dimensions that the difference in dimensions between the upper deck of a bi-level configuration and the top deck of a tri-level configuration is, ideally, 25⅜". Similarly, the difference in dimension between the upper deck of a bi-level configuration and the middle deck of a tri-level configuration is 38⁵⁄₁₆". Given these differences in heights, it would be advantageous to have a deck adjusting system capable of moving the top and middle decks through unequal distances.

Notably, the standard triple deck automobile carrier uses straight-through flat decks. In a fixed deck system it would not offer a stacking advantage to use a depressed centre main deck, since the mom Or deck vehicle height would generally be determined by the second deck clearance above the end structure shear plate mounted over the railcar trucks.

Removal of the central section of the main sill, leaving only stub sills at the ends of the car permits the use of a depressed centre car, but with a continuous deck for end loading, rather than individual loading. A moveable second deck may be raised to permit, for example, one or two family vans to be loaded in the space permitted in the low central section, while sedans, or sports cars, are loaded over the end structure shear plates. The second deck may then be lowered to its loading position once the vans are in place. It is advantageous for such a loading system to be operable on relatively short notice, and for it to operate relatively quickly when required. It would also be advantageous for that system to be operable by a singe operator. A positively driven system for forcing the decks into position, as opposed to a gravity dependent system, is considered advantageous by the present inventor.

SUMMARY OF THE INVENTION

In one aspect of the invention, there is a moveable deck mechanism for mounting to a vehicle carrying railcar. The moveable deck mechanism comprises a pair of moveable decks one above the other for supporting vehicles; the decks being moveable toward each other to a first position in which vehicles can be loaded on the one of the decks, and moveable away from each other to a second position in which vehicles can be loaded on both of the decks; and a drive system connected to the decks for positively driving the decks between the first and second positions.

In an enhancement of the one aspect of the invention, the vertical displacement of the one deck in moving between the positions is unequal to the vertical displacement of the other deck.

In another aspect of the invention, a vehicle carrying railcar comprises: a railcar support structure suspended between a pair of railcar trucks; a continuous main deck supported by the support structure and having a depressed portion between the railcar trucks; and a second continuous deck supported by the support structure and moveable to a loading position above the main deck while vehicles are on the main deck.

In an enhancement of that other aspect of the invention, the vehicle carrying railcar further comprises a third deck supported by the support structure above the second deck; the second and third decks being moveable toward each other to a first position in which vehicles can be loaded on the third deck, and moveable to a second position in which vehicles can be loaded on both the second and third decks; and a drive system mounted to the support structure for moving the second and third decks between the first and second positions.

In another enhancement of the other aspect of the invention, the support structure is a truss having an overhead structure, a pair of side sills and a pair of side web works joining the overhead frame to each of the side sills; and the second and third decks are mounted to the support structure between the side web works and beneath the overhead frame.

In yet another alternative enhancement of that other aspect of the invention, the vehicle carrying railcar is an articulated railcar having at least two railcar units joined by a common articulated railcar truck. Each railcar unit includes a second continuous deck supported by a support structure and moveable to a loading position above the main deck while vehicles are on the main deck. The respective second decks of each railcar unit are movable to permit loading of the respective first decks of the railcar units. The respective second decks are also moveable to corresponding loading heights, and separated by a bridgeable gap. As such, loading of the respective first and second decks can be accomplished by conducting vehicles from one unit to the other.

BRIEF DESCRIPTION OF THE DRAWINGS

For a better understanding of the present invention and to show more clearly how it may be carried into effect, reference will now be made by way of example to the accompanying drawings, which show an apparatus according to the preferred embodiment of the present invention and in which:

FIG. 3a is a perspective view at section '3a—3a' of the car carrier of FIG. 1.

FIG. 3b is a perspective view of a relatively flat decked railcar at a section corresponding to the section of FIG. 3a.

FIG. 3c is a perspective view of a prior art railcar at a section corresponding to the section of the automobile carrying railcar shown in FIG. 3a.

FIG. 4a is a perspective view taken from underneath the section of FIG. 3a showing a stub sill and body bolster.

FIG. 4b is a perspective view taken from underneath the section of FIG. 3b.

FIG. 4c is a perspective view taken from underneath the section of FIG. 3c, showing an example of a prior art underframe construction.

FIG. 6 is a simplified side view of the railcar of FIG. 1 showing a movable deck operating mechanism.

FIG. 7 is a conceptual plan of a deck locking mechanism for the railcar of FIG. 1.

FIG. 9b shows an end view of a deck support corresponding to FIG. 9a.

FIG. 10a shows an alternative mechanism to that shown in FIG. 9a.

FIG. 10b shows a side view of the mechanism of FIG. 10a.

FIG. 12b shows a partial sectional view on stepped section 12b—12b of FIG. 12a.

FIG. 14 shows a cross-section of a movable car deck for the railcar of FIG. 1.

FIG. 15 shows a perspective scrap view of the car deck of FIG. 14 in the region of a deck hanger for connection to the mechanism of FIG. 6.

DETAILED DESCRIPTION OF THE PREFERRED EMBODIMENT

Figure 1:
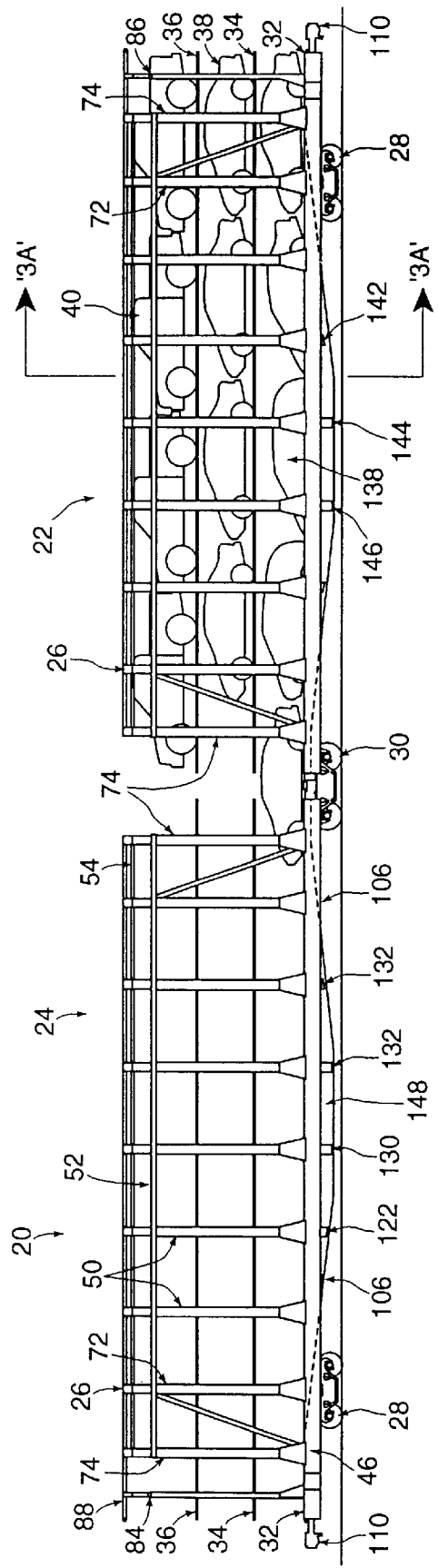
FIG. 1 is a side view of a two unit articulated railcar for carrying automobiles embodying the present invention.

The description of the invention is best understood by commencing with reference to FIG. 1, in which some proportions have been exaggerated for the purposes of conceptual illustration.

FIG. 1 shows a two unit articulated rail-car, 20, each unit, 22 or 24, having a support structure, namely a truss structure 26, carried upon, and spanning the longitudinal space between, an end truck 28 and an articulated truck 30, which it shares with the other unit. Truss structure 26 supports staging for carrying vehicles, namely a main deck 32, a middle deck 34, and an upper deck 36 upon which a load of automobiles 38 or trucks 40 can be carried. Middle deck 34 and upper deck 36 are movable on a centrally controlled deck height adjustment system 42, shown schematically in FIG. 6, which permits transformation from a bi-level configuration, or the reverse, to a tri-level configuration in a matter of minutes.

Figure 2:
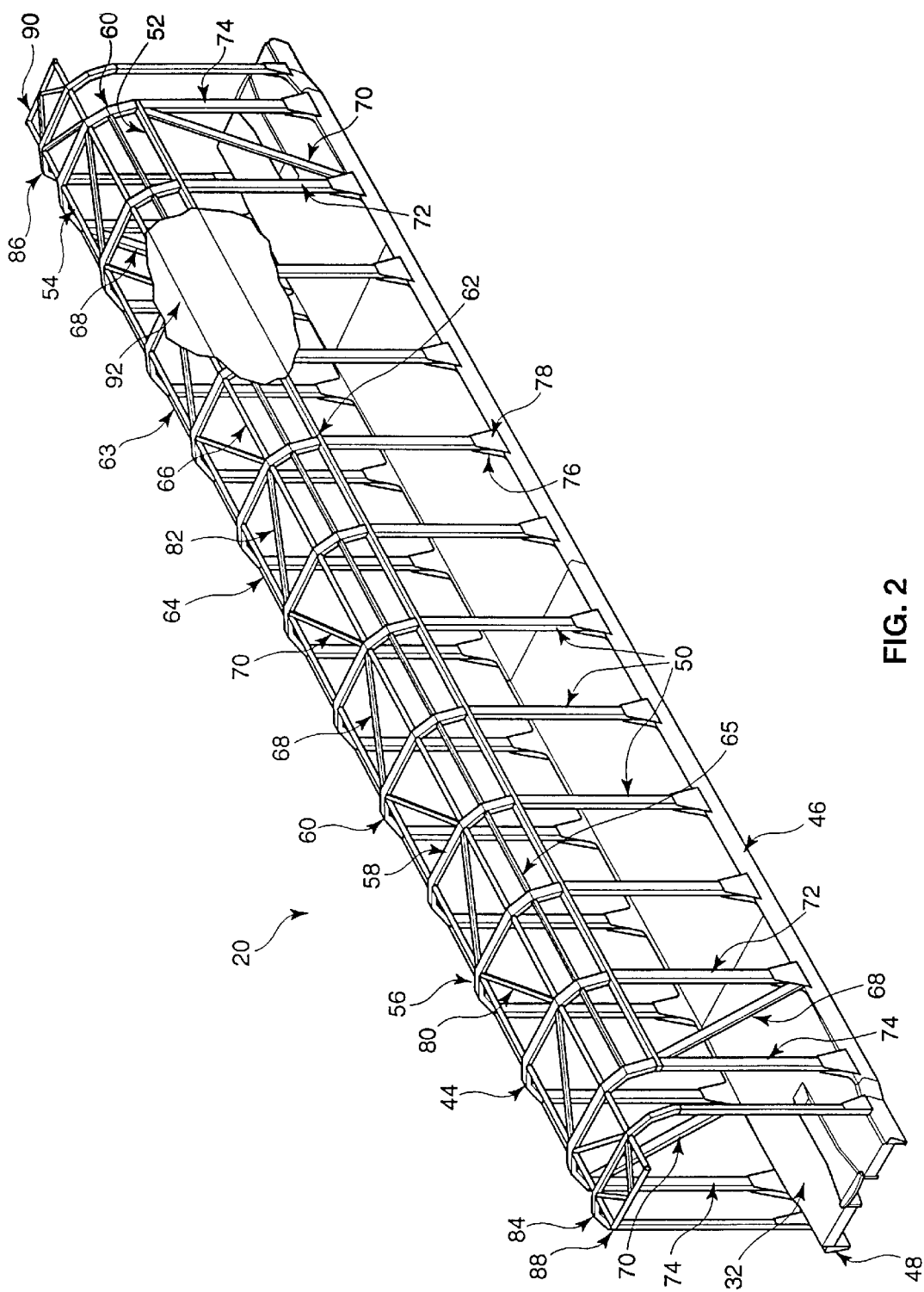
FIG. 2 is a perspective view of a skeleton of a single unit automobile railcar, with optional flat main deck, of construction similar to the articulated railcar of FIG. 1.

FIG. 2, shows a truss structure 44 having substantially the same construction as truss structure 26, but intended for use as a single unit railcar, rather than as a unit of a multiple unit articulated railcar. It differs from truss structure 26 principally in that it is longer, and has an optional relatively flat deck, as opposed to a deep center depressed main deck. Where applicable, features shared by truss structure 26 and truss structure 44 are given the same identifying numbers in the various views. Truss structure 44 has a pair of side sills 46 and 48 bounding main deck 32. Stanchions, or uprights 50, are spaced along, and extend upwardly from, each of side sills 46 and 48, to meet longitudinally extending top chords 52 and 54. Laterally mounted roof frames 56 extend above deck 36 as an overhead framework spanning the distance between top chords 52 and 54. Frames 56 have backs 58 and a pair of outwardly and downwardly tending segmented legs 60. Each leg 60 terminates in a foot 62 mounted to top chord 52 or 54, as the case may be, immediately above the top end of a corresponding upright 50. Stringers 63, 64, 65 and 66 extend longitudinally between frames 56 at the aligned vertices of backs 58 and legs 60 and at the knee joints of legs 60. In the preferred embodiment described, chords 52 and 54 are 5"×5"×3/16" square steel tube having a top surface nominally 210" above top of rail. The stringers are 3"×3" ×3/16" square steel tube, stringers 63 and 65 having upper edges nominally 231" above top of rail, stringers 64 and 66 having upper surfaces nominally 242" above top of rail. Other sizes of tube, angle iron and so on could be used without deporting from the spirit of the invention.

The rigidity of the truss structure 44 is enhanced, first, by diagonal members 68 and 70 extending upwardly from the junction of each penultimate upright 72 with sill 46, or 48, to the junction of each ultimate upright 74 and top chord 52, or 54; second by generous inner and outer stanchion root gusset plates 76 and 78; and third, by triangulating roof members 80 and 82, running on alternating diagonals between adjacent roof frames 56 and stringers 64 and 66. The final members of truss structure 26 are end frames 84 and 86, of reduced section, for supporting fore and aft roof extensions 88 and 90. A fiberglass covering 92, shown only partially, is wrapped over truss structure 44 when complete.

In this way truss structure 44, and also truss structure 26, each have a substructure, whose elements include sills 46 and 48; an overhead superstructure, whose elements include top chords 52 and 54, roof frames 56, stringers, 63, 64, 65 and 66, and shear members 80 and 82; and webwork whose elements include uprights 50, gusset plates 76 and 78, and diagonal members 68 and 70. Other intermediate diagonal members may also be used without departing from the spirit of the invention.

By analogy to a deep beam, the substructure and the superstructure act in a manner similar to flanges, and the webwork is so named because it joins the substructure and the superstructure with an effect similar to the web of a beam. In such a form, the substructure and the superstructure will tend to co-operate, in compression and tension respectively, to resist bending moments induced by vertical loads applied along truss structure 44. The effective depth of this quasi-beam is of the same order of magnitude as the overall height of the structure. This is significantly greater than merely the local depth of section of a traditional center sill or a pair of side sills. In contrast to older style cars, railcar 20 has no continuous main centre sill. Furthermore, although side sills 46 and 48 are used, their local sectional area, and local second moment of area, is significantly reduced relative to traditional main, centre sills.

It will be noted that, disregarding the contribution of diagonal members, the cross sectional area of the superstructure whose elements include top chords 52 and 54, roof frames 56, stringers, 63, 64, 65 and 66 is nominally about 15 in. sq. The cross sectional area of the substructure, that is, side sills 44 and 46, is just over 48 in. sq., giving a ratio of 5/16, or 31%. It will be appreciated that other proportions could be chosen, whether 1/5, 1/4, 1/3, 2/5, or another suitable ratio which provides both satisfactory resistance to bending and satisfy resistance to longitudinal draft and buff loads, while maintaining an acceptable centre of gravity. Similarly, the second moment of area and the centroidal height, that is, the height of the neutral axis in bending, may also differ from the values given for the preferred embodiment described. For example, for some purposes and lengths of automobile carrier, second moments of area may be little more than 20,000 or 50,000 in$^4$, for other purposes values in the range of 100,000; 200,000; 250,000; 300,000; 400,000 or 500,000 in$^4$ may be found to be more suitable. The centroidal height at a given longitudinal section, whether at a location over the trucks or between the trucks may be at, or slightly above, deck level, or they may be significantly higher. A centroidal height of 12 or 24 inches above the lowest, or main, deck can provide a significant improvement in structural characteristics. As noted, the embodiments described above have centroidal heights more than 30 inches above the top of side sills 46 and 48. In the case of center-depressed units in which the main deck is suspended below the level of the side sills with the vehicle wheel trackway contact height as little as 15 inches above top of rail, centroidal heights in the range of 50 to 60 inches, and perhaps as much as 75 inches above the trackway at mid span are within the range of contemplation.

In FIGS. 3a and 4a, connector end structure 96 of a unit 22 of railcar 20 rests upon truck 30 on a center plate 98. The load carried by center plate 98 is spread longitudinally into stub sill 100, and thence laterally to side sills 46 and 48 by the transversely extending arms of main body bolster 102, end cross-beam 104, and first cross beam 106. As shown, stub sill 100 is broadest at its bifurcated outboard end 108. (Other types of coupler and stub sill combinations could be used). Stub sill 100 has an inwardly narrowing bell mouth for accommodating a coupler 110, a medial portion of approximately constant section extending between end cross beam 104 and main body bolster 102, and a tapering inward portion which ends at first cross beam 106. Left and right hand sheer plates 112 and 114 are welded between stub sill 100 and side sills 46 and 48 respectively. They are located atop main body bolster 102 and end cross beam 104 and extend to the end of the car unit. They serve to encourage transfer of draft and buff loads between coupler 110 and side sills 46 and 48. Shear plates 112 and 114 are welded to provide wheel track ways 116 straddling, and at a lower level than, the top of stub sill 100, to allow a margin of extra height for vehicles loaded on the lowest deck.

Referring to FIGS. 1, 3a and 4a, adjoining the inboard edge of shear plates 112 and 114 main deck 32 has a downwardly ramped portion 118 lying generally inboard of main body bolster 102 and extending past first and second laterally extending U-sectioned cross beams 106 and 122 to terminate at a generally level central depressed floor portion 124. The underside of depressed floor portion 124 is supported along the intervening span to another stub sill at the other end of railcar 20 by laterally extending U-shaped channel cross beams 130, 132, 134 and 136. Cross beams 106 and 122 extend perpendicularly between, and are welded to, side sills 46 and 48 at stations corresponding to the locations of uprights 50. Beams 130, 132, 134 and 136 also extend perpendicularly between, but at a level below, side sills 46 and 48 at stations corresponding to the stations of uprights 50. In these locations hangar brackets 140, 142, 144, and 146, and side sheet 148 are used to provide a suitable load carrying connection. Hangar brackets 140, 142, 144, and 146 may effectively serve as extensions of uprights 50. Main deck 32 is also supported by track reinforcing channels 150 which run longitudinally between adjacent cross beams 106, 122, 130, 132, 134 and 136.

In the centre depressed articulated configuration of FIGS. 1, a family van, or small utility vehicle, 138 is shown supported by central depressed floor portion 124, whereas vehicles of lower profiles, that is, vehicles of lower overall height, can be carried in areas at trucks 28 and 30.

Referring now to FIGS. 3b and 4b, an alternative, relatively flat-deck structure has a center plate 98, a longitudinal stub sill 100, side sills 162 and 164; a main body bolster 102, end cross-beam 106, and first cross beam 104 all substantially the same as in FIG. 3a and 4a except as noted below. Main deck 152 has a first downwardly ramped portion 154 lying generally between end cross beam 106 and main body bolster 102, a generally level landing portion 156 extending inboard from body bolster 102, a second downwardly ramped portion 158, and finally, a relatively flat main deck floor 160 forming a wide, medial level web between side sills 162 and 164. The underside of main deck floor 160 is supported along the intervening span to another stub sill at the other end a railcar analogous to railcar 20 by laterally extending U-shaped channel cross beams 166 which extend perpendicularly between, and are welded to, side sills 162 and 164 at stations corresponding to the locations of uprights 50. Main deck floor 160 is also supported by track reinforcing channels 168 which run longitudinally between adjacent cross beams 166.

By contrast, as shown in FIGS. 3c and 4c, labelled "Prior Art", the differences from the preferred embodiment of FIGS. 3a and 4a, and of the alternative embodiment of FIGS. 3b and 4b, are readily apparent. FIGS. 3c and 4c show a continuous main sill 180, whose main, full depth portion 182 is absent from the structures illustrated in FIGS. 3a, 3b, 4a and 4b.

Although only four diagonal members, 68 and 70, have been shown in FIG. 2, a larger number of diagonal members could be used, or large gusset plates, such as, for example gusset plates 76, 78 could be used at both top and bottom ends of uprights 72. Diagonal reinforcement members could equally be used between top chords 52 and 54 stringers 64 and 66 and adjacent frames 56.

Furthermore, the open webwork shown, of vertical stanchions, diagonal braces, and gussets could be replaced by an alternative shear transferring assembly, whether a latticework, a reinforced shell, a wall made from vertically corrugated sheet, or the like.

By way of comparison, while the former, flat car type of structure had a second moment of area for resisting longitudinal bending of roughly 12,000 in$^4$, and a neutral axis at a height of roughly 24" above the top of the rail. That is, the neutral axis of the former structure was below the level of the main deck. In the centre depressed embodiment described, each of units 22 and 24 has a designed effective second moment of area at mid-span in excess of 450,000 in$^4$, with a neutral axis some 70 inches above the top of the rail, that is, more than 30 inches above the main deck level over the end trucks. The flat decked embodiment of truss structure 44 has a designed mid-span effective second moment of area in excess of 400,000 in$^4$. and a neutral axis more than 70 inches above the top of the rail. The combined effective mid-span cross-sectional area of side sills 46 and 48, estimated to be less than 50 in. sq., is less than the former main central sill effective area of about 60 in. sq, and markedly less than the combined former effective cross section of side sills and centre sill of roughly 76 in. sq. In the case of the mid-span of truss structure 44 the comparable design effective area is less than 45 in sq. The corresponding sectional weights per lineal foot reflect this difference.

Figures 5A, 5B:
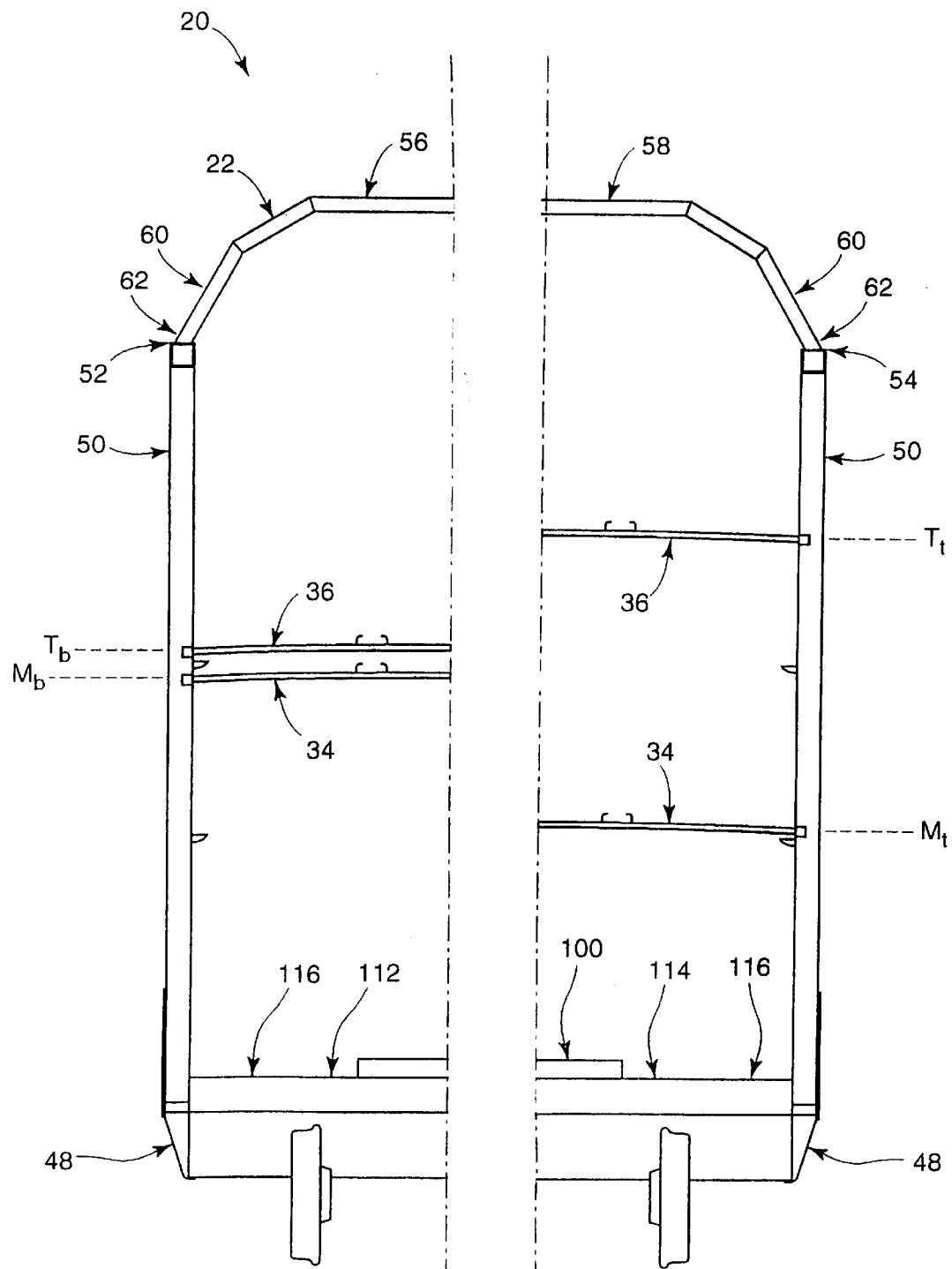
FIG. 5a shows a partial end view of the railcar of FIG. 1 in bi-level configuration.
FIG. 5b shows a partial end view of the railcar of FIG. 1 in tri-level configuration.
Figure 8A:
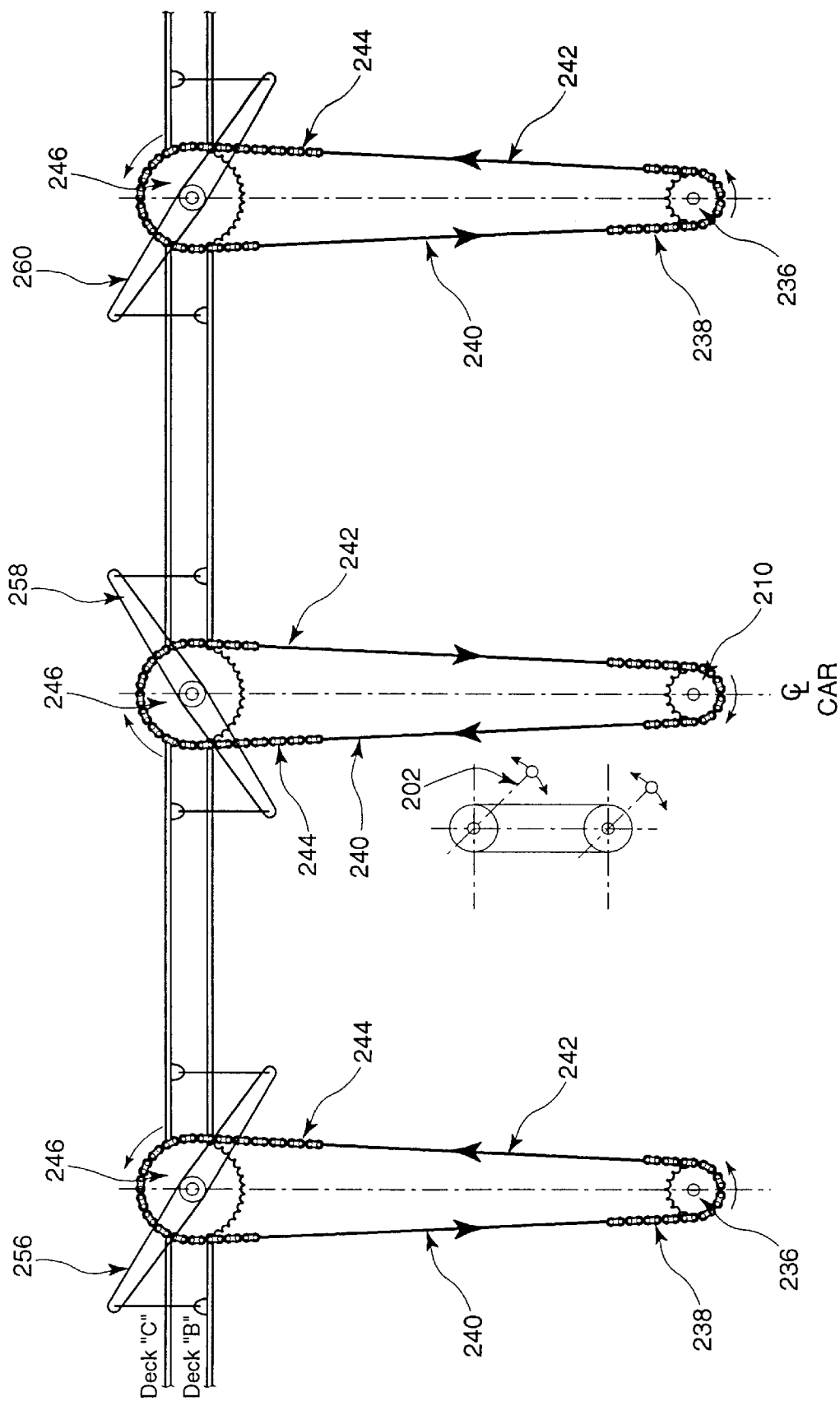
FIG. 8a shows a conceptual view of the deck operating mechanism of FIG. 6.
Figure 8B:
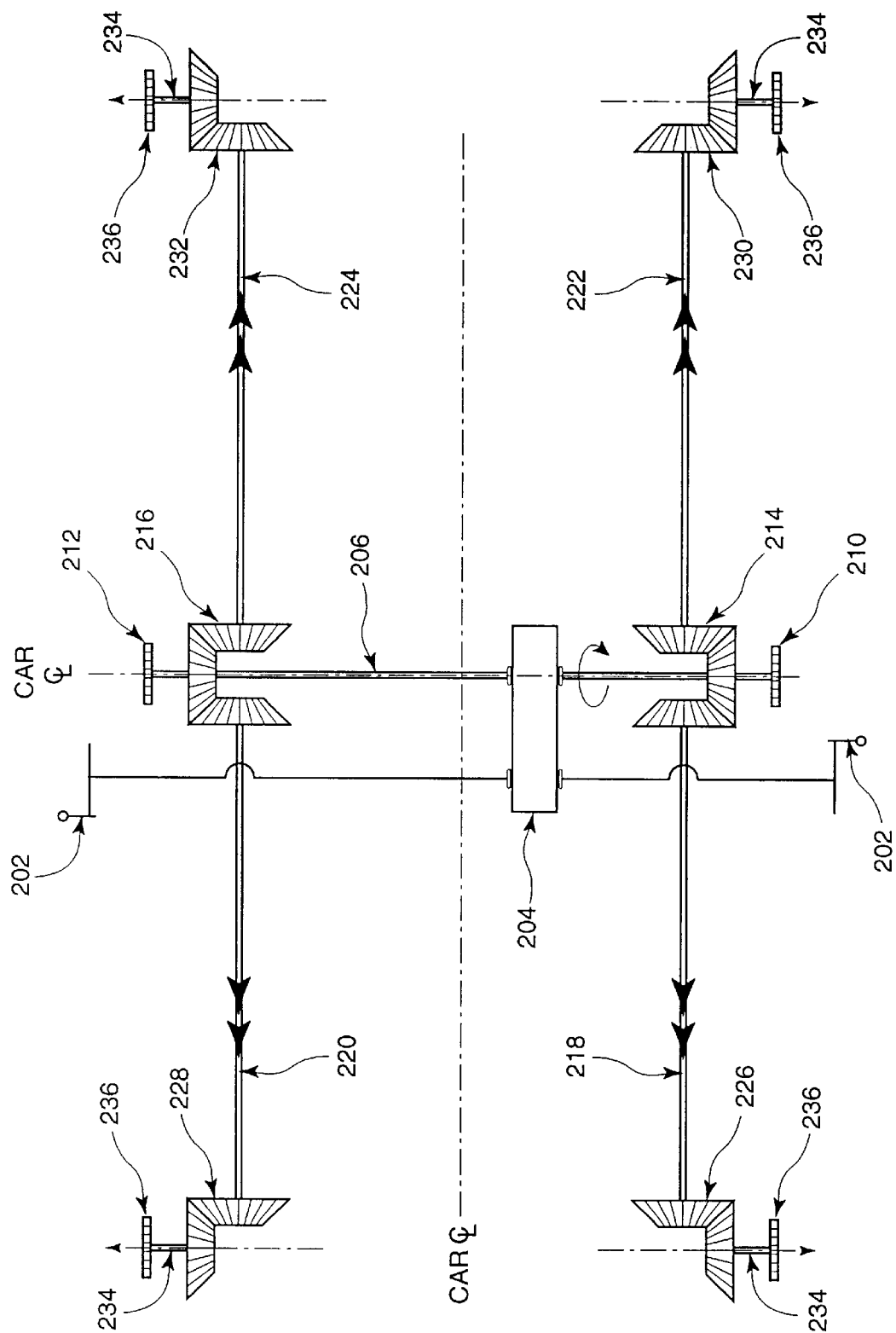
FIG. 8b shows a simplified diagram of a transmission system for driving the movable deck operating mechanism of FIG. 6.

FIGS. 5a and 5b show half sections of unit 22 of railcar 20 having middle deck 34 and an upper deck 36 in a bi-level configuration such that vehicles may be carried on main deck 32 and upper deck 36, but not on middle deck 34. By contrast, FIG. 5b shows railcar 20 in a tri-level configuration in which middle deck 34 has been lowered to position $M_t$, and upper deck 36, has been raised to a position $T_t$, such that three levels of vehicles can carried instead of two. Further, the use of deck height adjustment system 42, in conjunction with a railcar, such as railcar 20, having a centre depressed main deck can allow taller vehicles, i.e., vehicles having greater height, such as utility vehicle 138 to be loaded while middle deck 34 is in a raised, or partially raised, position. Deck 34 may then be lowered, locked in place, and loaded.

In the preferred embodiment shown, in which the dimensions refer to railcar 20 in an unloaded condition, as designed, the topmost surface of stub sill 100 is located 41" above the top of the railway track. The upper surfaces of shear plates 112 and 114 have an unloaded design height of 38" above rail. The clearance from shear plates 112 and 114, to the underside of middle deck 34 is 87" in the bilevel configuration position $M_b$. The mid-car upper surface of main deck 32 is 31.5" above rail, giving a corresponding clearance of 93.5". Also in FIG. 5a, the uppermost surface of upper deck 36, at position $T_b$ is roughly 131¾" above rail, and has a centre-line vertical clearance inside roof frames 56 of 93¼". The position of upper deck 36 is designated in FIG. 5a as $T_b$. In the tri level configuration of FIG. 5b, at position $M_t$, middle deck 34 has been lowered roughly 31⅛" to have a centre-line clearance of 62⅜" from main deck 32, and upper deck 36, at position $T_t$ has been raised to have a centre-line clearance of roughly 67" inside roof frames 56. This leaves a clearance of 61⅞" between upper deck 36 and middle deck 34.

Adjustment of the positions of upper deck 36 and middle deck 34, is described with the aid of FIGS. 6 through 15. Deck height adjustment system 42 is controlled by an operator who turns a crank 202 connected to the input shaft of a gear reducer 204. An output shaft 206 from gear reducer 204 extends across railcar 20. Shaft 206 drives a pair of left and right side end sprockets 210 and 212, and, by means of left and right side bevel gear sets 214 and 216, left and right hand counter-rotating fore and aft drive shafts 218, 220, 222, and 224. Each of these drive shafts leads to an output pair of bevel gears 226, 228, 230 and 232 respectively, which each drive a stub axle 234 and outboard drive pinion 236. Each of drive pinions 210, 212, or 236 imparts motion to a lower partial chain 238. Chain 238, a pair of wire ropes 240 and 242 and a driven partial chain 244 form a loop for driving a driven sprocket 246. Driven sprocket 246 is connected to one of several pairs of rotating arms and drag-links, each ultimately connected to the middle and upper decks, such as will be more fully described below. Through this transmission a person (or a motor) turning crank 202 can adjust the levels of middle deck 34, and upper deck 36.

It will be noted that crank 202 is shown at two different heights relative to gear reducer 204. These locations are designated as $H_1$ and $H_2$, and are joined by a common chain loop. Crank 202 has a removable handle that fits into a socket at one or the other height, as can be chosen by the operator. In some circumstances the railcar may be drawn up next to a platform, such that the crank would be at the operator's foot level. In that case the operator can fit the crank into the upper socket at location $H_2$. In the case where the railcar is not next to a platform, the upper crank location could be uncomfortably high. In that case crank 202 would be inserted in the lower crank location $H_1$.

In FIG. 7, three pairs of arms, 250, 252, and 254 are pivotally mounted at forward, central, and aft positions on suitable support structure, such as uprights 50. Another three pairs of arms 256, 258 and 260 are located on the opposite side of the railcar in corresponding positions. In shorter units, two mechanisms may be used.

Figure 9B:
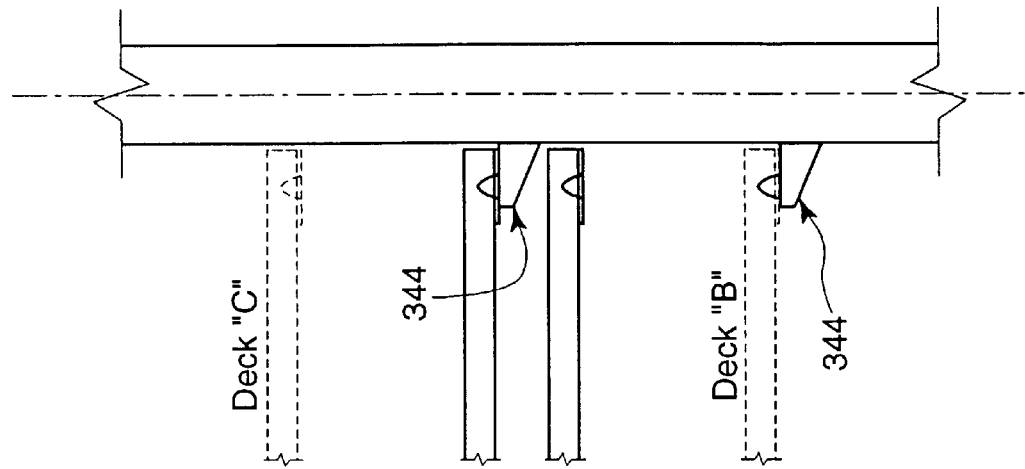
Figure 9A:
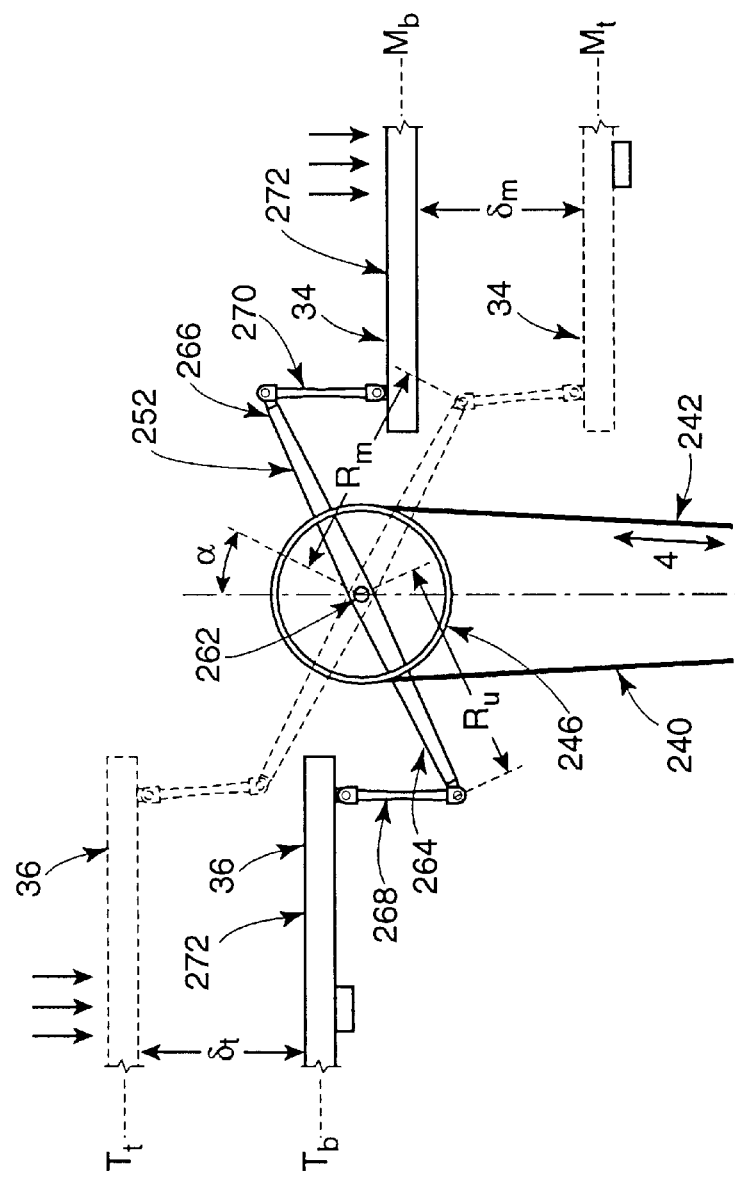
FIG. 9a shows an enlarged side view of a portion of the mechanism of FIG. 6.

As shown in FIG. 9a, each pair of arms is mounted on an axle 262, and has an upper deck arm 264 extending radially away from axle 262 a distance $R_u$. A radially opposite middle deck arm 266 extends radially away a distance $R_m$. Attached to respective distal portions of arms 264 and 266 are an upper deck drag link 268 and a middle deck drag link 270. In operation, movement of partial chain 244, as indicated by arrow ψ, causes rotation of sprocket 246 through an angle indicated by arrow α, with resulting displacement of middle deck 34 and upper deck 36 as indicated by arrows $\delta_m$ and $\delta_t$ respectively.

In the preferred embodiment $R_m$ may be longer than $R_u$ for the same length of links 268 and 270. However, drag links 268 and 270 need not be of equal length. Also mounted about axle 262 is driven gear sprocket 246, noted above, rigidly connected to arms 264 and 266, such that rotation of one is accompanied by rotation of the others. Central arms 252 and 258 rotate in the opposite sense to fore and aft arms 250, 254, 256 and 260, a feature tending to permit the decks to be driven downward, or upward, as opposed to requiring help from gravity, and tending also to force the decks to move along a unique path. That is, the configuration resists longitudinal displacement of decks 34 and 36.

FIGS. 14 and 15 show, typically, the structure of either upper deck 36 or middle deck 34, and details of the mating connection with either drag link 268 or drag link 270. The decks are formed from a longitudinally corrugated sheet 272 having a crowned cross section when viewed longitudinally as in FIG. 14. Left and right hand track stiffeners 274 and 276 in the form of a tubular steel beam or equivalent which are welded to the underside of sheet 272. Stiffeners 274 and 276 extend the length of sheets 272.

At each locking station a top doubler 278 is welded to the top face of sheet 272 with fore and aft edges located approximately on the centre-lines of parallel corrugations, an inboard edge located above the centre of stiffener 274 or 276, and an outboard edge 280 extending well outboard of the side edge of sheet 272. An end wall 282 is welded across the ends of the corresponding corrugations. A pair of transverse vertical gussets 284 and 286 are welded in the downwardly opening channels of the parallel corrugations of sheet 272. They extend outwardly from track stiffener 274 to meet a lower doubler plate 288 on either end of end wall 282. A depending web 290 is set outboard of, and parallel to end wall 282 between gussets 284 and 286 to form a rigid box structure. Finally, a clevis 292 is mounted to the top side of doubler 278, in line with depending web 290, to accept the one end of link 268 or 270.

Although deck adjustment height system transmission 42 is used to adjust the heights of middle deck 34 and upper deck 36, it is not used to maintain them in position. For that purpose a locking system has been provided. The system given in FIG. 7, shows a total of twenty four locking pin and guide mechanisms 300, twelve for each of middle deck 34 and upper deck 36. Symmetrically distributed at the C.L. of the car. The number of locking and guiding mechanisms is dependent on the length of the deck.

Mechanisms 300 are joined by a common release mechanism 302. Fore and aft release spickets 304 and 306 are mounted to the underside of decks 34 and 36. They carry an operating cable 308, with a suitable chain link portion 310. In FIG. 7, cable 308 connects with six linkage quadrants 312 spaced along the length of the car at positions corresponding to the locking stations. Each quadrant 312, FIG. 11 has a pair of diagonal linking arms 314 located on operating cable 308 such that movement of operating cable 308 causes quadrants 312 to turn in unison. Each quadrant 312 also has a pair of shorter cross-arms 316 connected by pin-jointed linkages to left and right hand connecting rods 318. When each quadrant is turned from 'A' to 'B', shown in shadow, connecting rods 318 will be pulled inboard.

Figure 12A:
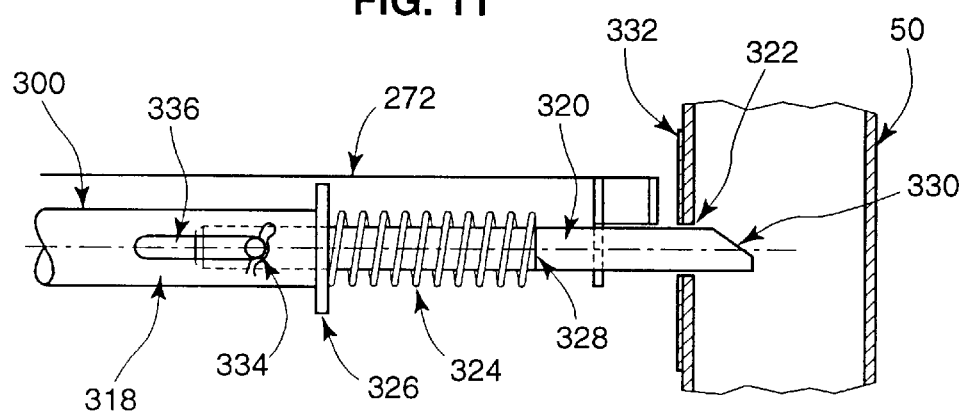
FIG. 12a shows a side view of a locking pin of the locking system of FIG. 7.
Figure 12B:
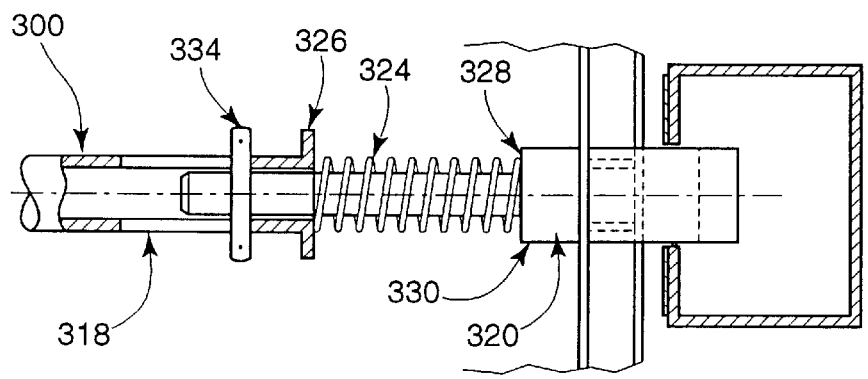

At the outboard end of each connecting rod 318 is a spring loaded pin 320 mounted to the underside of sheet 272, shown in top and side views in FIGS. 12a and 12b respectively. When pin 320 is fully outwardly extended it can locate in any convenient aperture 322 in upright 50 under the urging of a spring 324 trapped between a flanged outboard end 326 of connecting rod 318 and a shoulder 328 of pin head 330. Upright 50 has a wear plate 332 mounted on its inwardly exposed face. When quadrant 312 turns, connecting rod 318 is retracted and works against a securing pin 334 located in the shank of pin 320 to withdraw pin 320 from upright 50. Once withdrawn, decks 34 and 36 may move up or down as required. When quadrant 312 is returned to 'A', connecting rod 318 returns to its extended position. If pin 320 is still riding on wear plate 332, securing pin 334 will float in a slot 336 until the outboard tip of pin 320 finds the next aperture 322 and is urged home by spring 324.

Figure 13A:
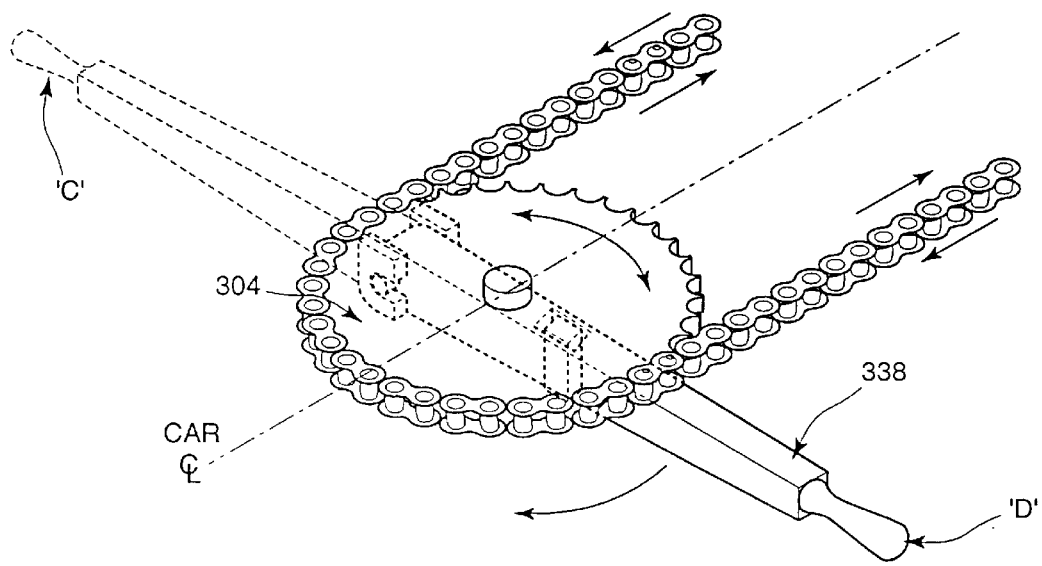
FIG. 13a shows a perspective view of an arm for the locking system of FIG. 7.
Figure 13B:
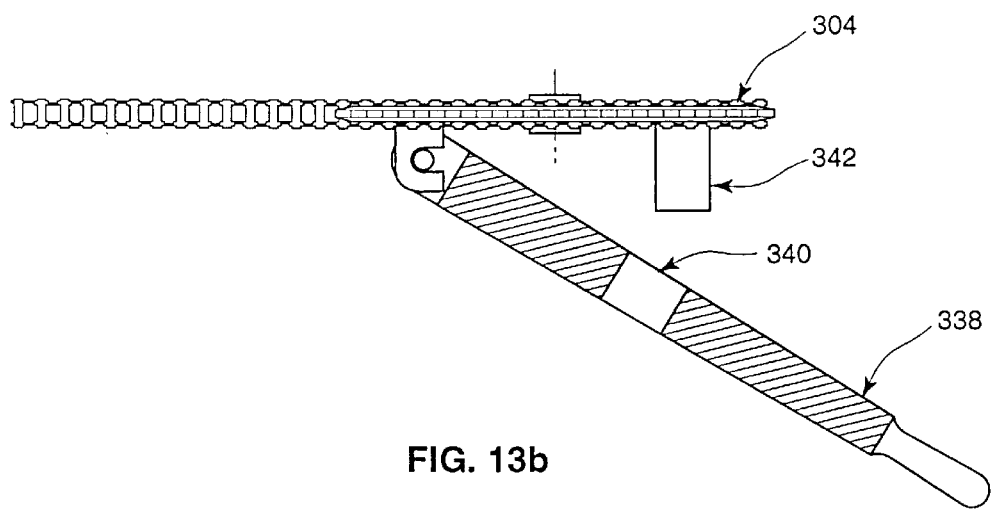
FIG. 13b is a view on arrow 13b of FIG. 13a, but with the arm shown in an intermediate position.

A handle 338 is provided with sprockets 304 and 306. In the preferred embodiment, as shown in FIGS. 13a and 13b, handle 338 is hinged to pivot away from sprocket 304 between a non-operative position 'C', and an operative position 'D'. In 'D' a socket 340 in handle 338 pikeks up on a lug 342 on sprocket 364. With lug 342 engaged, a pull on handle 338 as indicated by arrow 'E' will cause release mechanism 302 to operate.

Turning finally to FIGS. 9a and 9b, in the preferred embodiment each of decks 34 and 36 will find its lowest position on fixed blocks 344 mounted to uprights 50. When moved to their upper positions pin 320 will seek aperture 322 as described above. In an alternative embodiment upper and lower apertures could be provided in uprights 50 for both raised and lowered positions.

Alternative embodiments to those described above may be employed without departing from the principles of the present invention. For example, the staging upon which the vehicles are to be carried need not be the specific preferred form of decking shown. It may, for example, relate to spaced apart trackways carried on an open frame with adjacent catwalks. Alternatively it may relate to trackways independently cantilevered out from each of the walls, or to continuous decking sheets with central portions removed. It may relate to an open grillwork, or grating, such as may be found suitable.

Figure 10B:
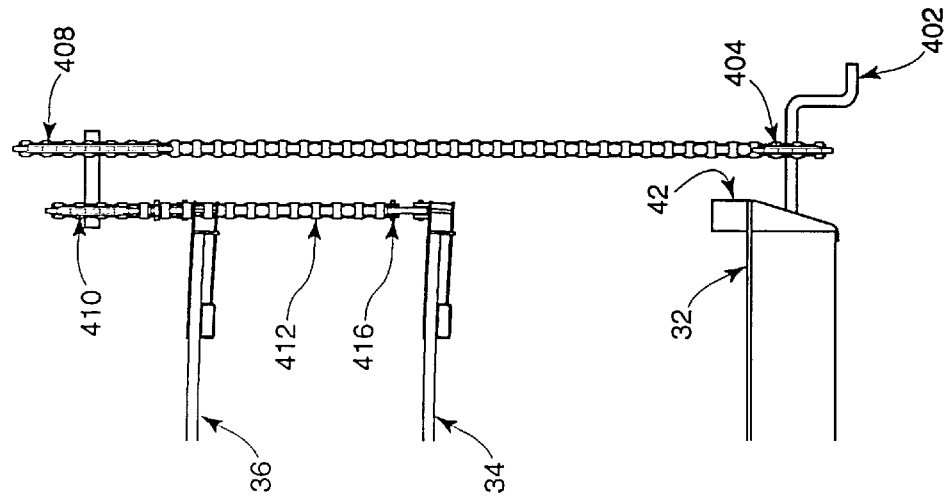
Figure 10A:
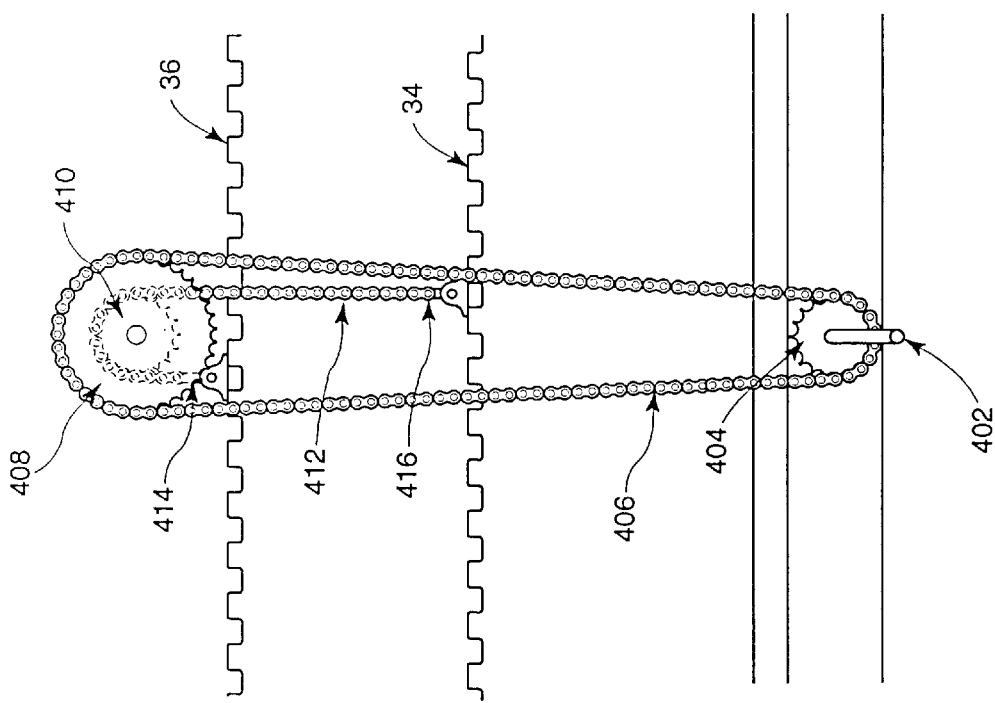
Figure 11:
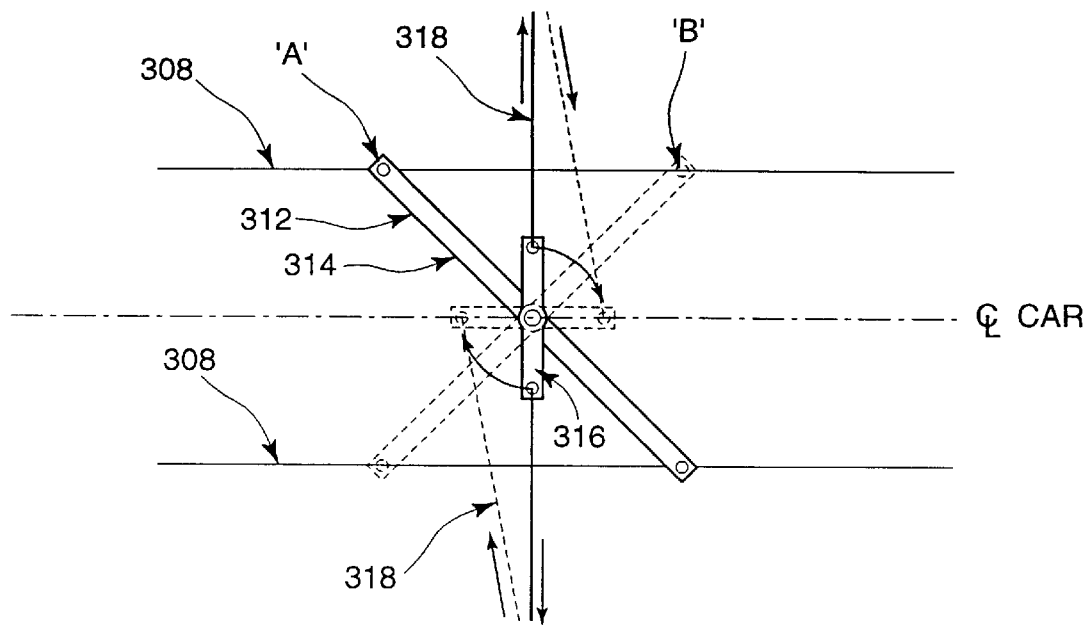
FIG. 11 shows a bell-crank mechanism for use with the locking system of FIG. 7.

Similarly, alternative deck adjustment mechanisms may be used. One such example is shown in FIGS. 10a and 10b. As before, a crank 402 is used to drive a deck adjustment mechanism. Crank 402 turns a small gear 404 linked by a chain 406 to a large gear 408. Large gear 408 is co-axially mounted with a smaller gear, 410, over which a chain 412 rides. Chain 412 has one end 414 connected to middle deck 34, and another end 416 connected to upper deck 36. There is a gear reduction between small gear 404 and large gear 408, and a further mechanical advantage between large gear 408 and smaller gear 410. This particular alternative does not rely on a positively driven mechanism, but rather depends on gravity.

Extension of chain 412 to form a continuous loop about an idler sprocket would permit the system to be positively driven. Alternatively, given an adequate reduction gear, decks 34 and 36 could be yoked directly to chain 406, once again in a positively driven manner. A number of similar variations on chain an sprocket systems are possible. Similarly, although bevel gears and shafting are shown, a hydraulic, electric, or pneumatic system could be used to drive the deck adjustment system.

The principles described above are applicable to single unit vehicle carrying railcars or to multiple unit articulated vehicle carrying railcars. In the case of an articulated railcar, such as two unit articulated rail car 20 or three, four, or five unit articulated railcars, each unit has corresponding moveable decks. These moveable decks are moveable to permit loading of the lowest deck by end loading from one, or either, end of the articulated railcar. A vehicle loaded at one end can then be conducted from one unit to the next along continuous trackways not only between the higher portions over the railcar trucks and the depressed portions slung between pairs of railcar trucks, but also between railcar units. Similarly, the respective second (or third) decks of the railcar units can be moved to corresponding heights to permit end loaded vehicles to move from the second, (or third), deck of one railcar unit to another. The adjacent second and third decks of the respective railcar units are generally separated by a bridgeable gap, with temporary bridging used when the railcars are stationary to permit vehicles to be moved from one unit to another across the gaps.

Although a particular preferred embodiment of the invention, and a number of alternative embodiments have been described herein and illustrated in the FIGS., the principles of the present invention are not limited to those specific embodiments. The invention is set only to be limited by the claims which follow, and to their equivalents.

I claim:

1. A moveable deck mechanism for mounting to a vehicle carrying railcar, said moveable deck mechanism comprising:

a pair of decks, one above the other, for supporting vehicles, each of said pair of decks being moveable, each of said decks having a pair of ends and having sides running between said ends;

the decks being moveable to a first position in which vehicles can be loaded on one of the decks, and being moveable to a second position in which vehicles can be loaded on both of the decks;

a first pair of arms mounted on opposite sides of said decks, said first pair of arms being mountable to the railcar, and being pivotable between angles corresponding to said first and second positions of said decks;

a second pair of arms mounted on opposite sides of said decks, said second pair of arms being mountable to the railcar, and being pivotable between angles corresponding to said first and second positions of said decks;

said first pair of arms and said second pair of arms being operable to pivot in opposite directions as said decks move between said first and second positions; and a drive system connected to drive the decks between the first and second positions.

2. The moveable deck mechanism of claim 1 wherein the mechanism includes a releasable locking system for locking the one deck in the second position and for locking the other deck in the first position.

3. The mechanism of claims 2 further comprising stops for preventing the one deck from descending below the first position and for preventing the other deck from descending below the second position.

4. A moveable deck mechanism for mounting to a vehicle carrying railcar comprising:

a pair of moveable decks, one above the other, for supporting vehicles;

the decks moveable toward each other to a first position in which vehicles can be loaded on the one of the decks; and moveable away from each other to a second position in which vehicles can be loaded on both of the decks;

a drive system connected to the decks for positively driving the decks between the first and second positions;

a releasable locking system for locking the one deck in the second position and for locking the other deck in the first position; and stops for preventing the one deck from descending below the first position and for preventing the other deck from descending below the second position;

said locking system including spring loaded pins for engaging sockets located on upright members of the railcar, and the stops being abutments mounted to upright members of the railcar.

5. A vehicle carrying railcar comprising:

a vehicle support structure suspended between a pair of railcar trucks;

a continuous main deck supported by the support structure between the trucks; and a moveable deck mechanism mounted to said railcar support structure and having a pair of decks one above the other for supporting vehicles, each of said pair of decks being moveable, each of said decks having a pair of ends and having sides running between said ends;

each deck of the pair of moveable decks being moveable to a first position in which vehicles can be loaded on the one of the pair, and being moveable to a second position in which vehicles can be loaded on both of the pair, a first pair of arms mounted on opposite sides of said decks, said first pair of arms being mountable to the railcar, and being pivotable between angles corresponding to said first and second positions of said decks;

a second pair of arms mounted on opposite sides of said decks, said second pair of arms being mountable to the railcar, and being pivotable between a angles corresponding to said first and second positions of said decks;

said first pair of arms and said second pair of arms being operable to pivot in opposite directions as said deck move between said first and second positions; and a drive system connected to drive the decks between the first and second positions.

6. The vehicle carrying railcar of claim 5 wherein:

the support structure is a truss having an overhead frame structure, said overhead frame structure having
longitudinal frame members located above said moveable decks,
a pair of side sills and
a pair of side web works joining the overhead frame to each of the side sills; and the pair of moveable decks are second and third decks mounted to the support structure between the side web works and beneath the overhead frame.

7. The vehicle carrying railcar of claim 6 wherein the railcar further comprises a reasonably engageable locking mechanism mountable with the support structure for locking the second and third decks in position.

8. The vehicle carrying railcar of claim 7 wherein the locking mechanism includes a release mechanism manually operable by a single operator at a single position.

9. The vehicle carrying railcar of claim 5 wherein the drive system is manually operable from a single location by a single operator.

10. The vehicle carrying railcar of claim 9 wherein the drive system includes a reduction gear drive driven by a single manually operable crank.

11. The vehicle carrying railcar of claim 5 wherein said railcar is an articulated railcar having at least two railcar units joined by a common articulated railcar truck, and each railcar unit includes a pair of said moveable decks, said moveable decks being continuous decks supported by said support structure and moveable to a loading position above the main deck while vehicles are on the main deck, the respective moveable decks of each railcar unit being movable to permit loading of respective main decks of the railcar units, and moveable to corresponding loading heights, and separated by a bridgeable gap, whereby loading of the respective first and second decks can be accomplished by conducting vehicles from one unit to the other.

12. The vehicle carrying railcar of claim 5 wherein said main deck has a depressed center portion between said railcar trucks.

* * * * *